US012702528B2

(12) United States Patent
Wu et al.

(10) Patent No.: US 12,702,528 B2
(45) Date of Patent: Aug. 11, 2026

(54) RELAPSE PREVENTION RETAINER

(71) Applicant: Align Technology, Inc., San Jose, CA (US)

(72) Inventors: Ken Wu, San Jose, CA (US); Huizhong Li, San Jose, CA (US); Mitra Derakhshan, Herndon, VA (US); Zhou Yu, Santa Clara, CA (US); James Nishimuta, Durham, NC (US); Yuxiang Wang, Newark, CA (US); Xi Cai, San Jose, CA (US); Rohit Tanugula, San Jose, CA (US); Jeeyoung Choi, Sunnyvale, CA (US); Eric Yau, Santa Clara, CA (US); Jun Sato, San Jose, CA (US); John Y. Morton, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 805 days.

(21) Appl. No.: 18/149,037

(22) Filed: Dec. 30, 2022

(65) Prior Publication Data

US 2023/0210637 A1 Jul. 6, 2023

Related U.S. Application Data

(60) Provisional application No. 63/295,506, filed on Dec. 30, 2021.

(51) Int. Cl.

| | |
|---|---|
| ***A61C 7/08*** | (2006.01) |
| ***A61C 7/00*** | (2006.01) |
| ***A61C 13/34*** | (2006.01) |
| ***G06F 30/20*** | (2020.01) |

(52) U.S. Cl.

CPC ................ *A61C 7/08* (2013.01); *A61C 7/002* (2013.01); *A61C 13/34* (2013.01); *G06F 30/20* (2020.01)

(58) Field of Classification Search

None

See application file for complete search history.

(56) References Cited

U.S. PATENT DOCUMENTS

| | | | |
|---|---|---|---|
| 5,820,368 | A | 10/1998 | Wolk |
| 6,183,248 | B1 | 2/2001 | Chishti et al. |
| 6,309,215 | B1 | 10/2001 | Phan et al. |
| 6,386,864 | B1 | 5/2002 | Kuo |
| 6,454,565 | B2 | 9/2002 | Phan et al. |
| 6,471,511 | B1 | 10/2002 | Chishti et al. |
| 6,524,101 | B1 | 2/2003 | Phan et al. |
| 6,572,372 | B1 | 6/2003 | Phan et al. |
| 6,607,382 | B1 | 8/2003 | Kuo et al. |
| 6,705,863 | B2 | 3/2004 | Phan et al. |
| 6,783,604 | B2 | 8/2004 | Tricca |
| 6,790,035 | B2 | 9/2004 | Tricca et al. |
| 6,814,574 | B2 | 11/2004 | Abolfathi et al. |
| 6,830,450 | B2 | 12/2004 | Knopp et al. |
| 6,947,038 | B1 | 9/2005 | Anh et al. |
| 7,074,039 | B2 | 7/2006 | Kopelman et al. |

(Continued)

*Primary Examiner* — Paul S Schwarzenberg

(74) *Attorney, Agent, or Firm* — Shay Glenn LLP

(57) ABSTRACT

Apparatuses and methods for customized retainers to prevent relapse. In particular, described herein are customized retainers, and methods and apparatuses for making customized retainers that specifically reenforce and prevent movement of one or more teeth having a higher likelihood of relapse following completion of an orthodontic treatment plan.

25 Claims, 8 Drawing Sheets

(56) References Cited

U.S. PATENT DOCUMENTS 7,104,792 B2 9/2006 Taub et al.
7,121,825 B2 10/2006 Chishti et al.
7,160,107 B2 1/2007 Kopelman et al.
7,192,273 B2 3/2007 McSurdy, Jr.
7,347,688 B2 3/2008 Kopelman et al.
7,354,270 B2 4/2008 Abolfathi et al.
7,448,514 B2 11/2008 Wen
7,481,121 B1 1/2009 Cao
7,543,511 B2 6/2009 Kimura et al.
7,553,157 B2 6/2009 Abolfathi et al.
7,600,999 B2 10/2009 Knopp
7,658,610 B2 2/2010 Knopp
7,766,658 B2 8/2010 Tricca et al.
7,771,195 B2 8/2010 Knopp et al.
7,854,609 B2 12/2010 Chen et al.
7,871,269 B2 1/2011 Wu et al.
7,878,801 B2 2/2011 Abolfathi et al.
7,878,805 B2 2/2011 Moss et al.
7,883,334 B2 2/2011 Li et al.
7,914,283 B2 3/2011 Kuo
7,947,508 B2 5/2011 Tricca et al.
8,152,518 B2 4/2012 Kuo
8,172,569 B2 5/2012 Matty et al.
8,235,715 B2 8/2012 Kuo
8,292,617 B2 10/2012 Brandt et al.
8,337,199 B2 12/2012 Wen
8,401,686 B2 3/2013 Moss et al.
8,517,726 B2 8/2013 Kakavand et al.
8,562,337 B2 10/2013 Kuo et al.
8,641,414 B2 2/2014 Borovinskih et al.
8,684,729 B2 4/2014 Wen
8,708,697 B2 4/2014 Li et al.
8,758,009 B2 6/2014 Chen et al.
8,771,149 B2 7/2014 Rahman et al.
8,899,976 B2 12/2014 Chen et al.
8,899,977 B2 12/2014 Cao et al.
8,936,463 B2 1/2015 Mason et al.
8,936,464 B2 1/2015 Kopelman
9,022,781 B2 5/2015 Kuo et al.
9,119,691 B2 9/2015 Namiranian et al.
9,161,823 B2 10/2015 Morton et al.
9,241,774 B2 1/2016 Li et al.
9,326,831 B2 5/2016 Cheang
9,433,476 B2 9/2016 Khardekar et al.
9,610,141 B2 4/2017 Kopelman et al.
9,655,691 B2 5/2017 Li et al.
9,675,427 B2 6/2017 Kopelman
9,700,385 B2 7/2017 Webber
9,744,001 B2 8/2017 Choi et al.
9,844,424 B2 12/2017 Wu et al.
10,045,835 B2 8/2018 Boronkay et al.
10,111,730 B2 10/2018 Webber et al.
10,150,244 B2 12/2018 Sato et al.
10,201,409 B2 2/2019 Mason et al.
10,213,277 B2 2/2019 Webber et al.
10,299,894 B2 5/2019 Tanugula et al.
10,363,116 B2 7/2019 Boronkay
10,383,705 B2 8/2019 Shanjani et al.
D865,180 S 10/2019 Bauer et al.
10,449,016 B2 10/2019 Kimura et al.
10,463,452 B2 11/2019 Matov et al.
10,470,847 B2 11/2019 Shanjani et al.
10,492,888 B2 12/2019 Chen et al.
10,517,701 B2 12/2019 Boronkay
10,537,406 B2 1/2020 Wu et al.
10,537,463 B2 1/2020 Kopelman
10,548,700 B2 2/2020 Fernie
10,555,792 B2 2/2020 Kopelman et al.
10,588,776 B2 3/2020 Cam et al.
10,613,515 B2 4/2020 Cramer et al.
10,639,134 B2 5/2020 Shanjani et al.
10,743,964 B2 8/2020 Wu et al.
10,758,323 B2 9/2020 Kopelman
10,781,274 B2 9/2020 Liska et al.
10,813,720 B2 10/2020 Grove et al.
10,874,483 B2 12/2020 Boronkay
10,881,487 B2 1/2021 Cam et al.
10,912,629 B2 2/2021 Tanugula et al.
10,959,810 B2 3/2021 Li et al.
10,993,783 B2 5/2021 Wu et al.
11,026,768 B2 6/2021 Moss et al.
11,026,831 B2 6/2021 Kuo
11,045,282 B2 6/2021 Kopelman et al.
11,045,283 B2 6/2021 Riley et al.
11,103,330 B2 8/2021 Webber et al.
11,123,156 B2 9/2021 Cam et al.
11,154,382 B2 10/2021 Kopelman et al.
11,166,788 B2 11/2021 Webber
11,174,338 B2 11/2021 Liska et al.
11,219,506 B2 1/2022 Shanjani et al.
11,259,896 B2 3/2022 Matov et al.
11,273,011 B2 3/2022 Shanjani et al.
11,278,375 B2 3/2022 Wang et al.
11,318,667 B2 5/2022 Mojdeh et al.
11,331,166 B2 5/2022 Morton et al.
11,344,385 B2 5/2022 Morton et al.
11,376,101 B2 7/2022 Sato et al.
11,419,702 B2 8/2022 Sato et al.
11,419,710 B2 8/2022 Mason et al.
11,471,253 B2 10/2022 Venkatasanthanam et al.
11,497,586 B2 11/2022 Kopelman
11,504,214 B2 11/2022 Wu et al.
11,523,881 B2 12/2022 Wang et al.
11,534,268 B2 12/2022 Li et al.
11,534,974 B2 * 12/2022 O'Leary ................ B33Y 10/00
11,554,000 B2 1/2023 Webber
11,564,777 B2 1/2023 Kopelman et al.
11,571,278 B2 2/2023 Kopelman et al.
11,571,279 B2 2/2023 Wang et al.
11,576,750 B2 2/2023 Kopelman et al.
11,576,752 B2 2/2023 Morton et al.
11,589,955 B2 * 2/2023 Medvinskaya ........ A61C 13/34
12,263,632 B2 * 4/2025 Martínez González .................... B29C 51/46
2002/0192617 A1 12/2002 Phan et al.
2004/0166462 A1 8/2004 Phan et al.
2004/0166463 A1 8/2004 Wen et al.
2005/0014105 A1 1/2005 Abolfathi et al.
2005/0186524 A1 8/2005 Abolfathi et al.
2005/0244768 A1 11/2005 Taub et al.
2006/0019218 A1 1/2006 Kuo
2006/0078841 A1 4/2006 DeSimone et al.
2006/0115782 A1 6/2006 Li et al.
2006/0115785 A1 6/2006 Li et al.
2006/0199142 A1 9/2006 Liu et al.
2006/0234179 A1 10/2006 Wen et al.
2008/0118882 A1 5/2008 Su
2008/0160473 A1 7/2008 Li et al.
2008/0286716 A1 11/2008 Sherwood
2008/0286717 A1 11/2008 Sherwood
2009/0280450 A1 11/2009 Kuo
2010/0055635 A1 3/2010 Kakavand
2010/0129763 A1 5/2010 Kuo
2011/0269092 A1 11/2011 Kuo et al.
2014/0067334 A1 3/2014 Kuo
2015/0366638 A1 12/2015 Kopelman et al.
2016/0193014 A1 7/2016 Morton et al.
2017/0007359 A1 * 1/2017 Kopelman ............. B33Y 80/00
2017/0007361 A1 1/2017 Boronkay et al.
2017/0135793 A1 5/2017 Webber et al.
2017/0165032 A1 6/2017 Webber et al.
2018/0360567 A1 12/2018 Xue et al.
2019/0000592 A1 1/2019 Cam et al.
2019/0000593 A1 1/2019 Cam et al.
2019/0008613 A1 * 1/2019 Cao .......................... A61C 7/08
2019/0046297 A1 2/2019 Kopelman et al.
2019/0099129 A1 4/2019 Kopelman et al.
2019/0125497 A1 5/2019 Derakhshan et al.
2019/0262101 A1 8/2019 Shanjani et al.
2019/0298494 A1 10/2019 Webber et al.
2020/0000553 A1 1/2020 Makarenkova et al.
2020/0100866 A1 4/2020 Medvinskaya et al.
2020/0155276 A1 5/2020 Cam et al.
2020/0188062 A1 6/2020 Kopelman et al.

(56) References Cited

U.S. PATENT DOCUMENTS

2020/0214598 A1 7/2020 Li et al.
2020/0214801 A1 7/2020 Wang et al.
2020/0390523 A1 12/2020 Sato et al.
2021/0147672 A1 5/2021 Cole et al.
2021/0196429 A1 7/2021 Shojaei et al.
2022/0160467 A2* 5/2022 Shojaei .................. A61C 7/002

* cited by examiner

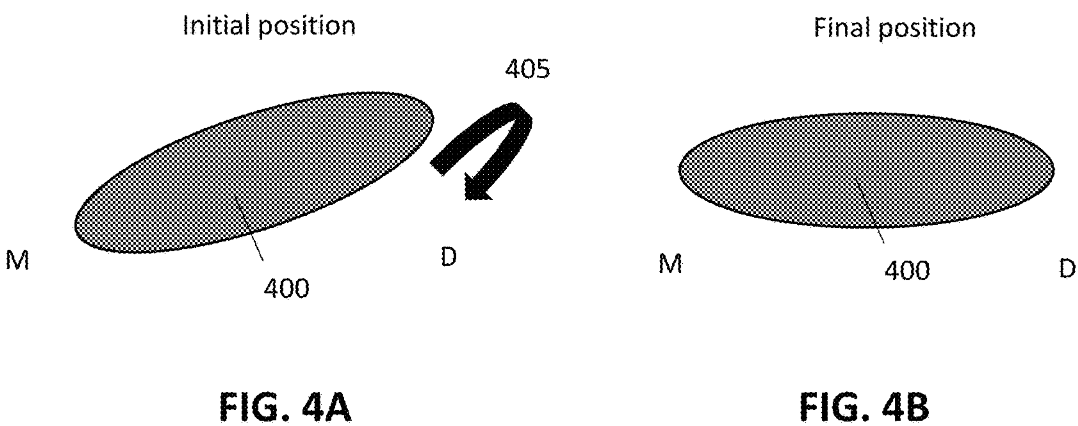
FIG. 4A
FIG. 4B
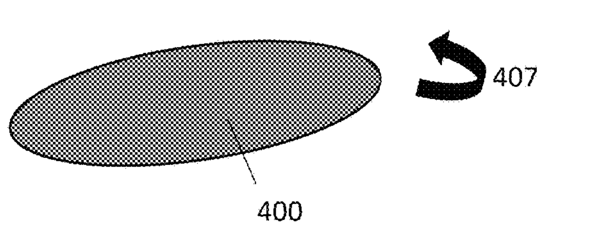
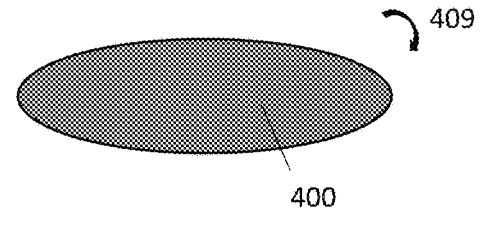
FIG. 4C
FIG. 4D
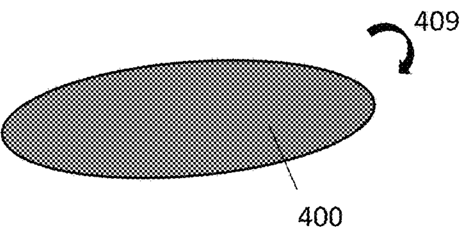
FIG. 4E

RELAPSE PREVENTION RETAINER

CLAIM OF PRIORITY

This patent application claims priority to U.S. Provisional Patent Application No. 63/295,506, titled "RELAPSE PREVENTION RETAINER," filed on Dec. 30, 2021, herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

At the end of orthodontic treatment, a retainer is often useful to hold the teeth in their new position long enough for the biology to stabilize. If the teeth are not held in place well enough, these teeth may relapse due to the supercrestal fibers of the PDL (periodontal ligament) and soft vulnerable tissues of the root socket and the elasticity of the periodontal ligament pulling them back to their previous position. In addition, the position of the teeth in the bite, and/or occlusal interference may also lead to relapse.

The traditional method for offering retention is to create a custom molded appliance at the idealized final position of the teeth. Retainers are sometimes made using plastic thermoforming (Vivera) or a hard acrylic resin, with or without metal wires (Hawley). These devices are static and typically cannot account for many of the types of relapse movement that may occur, nor the directionality of that relapse. Thus, it would be beneficial to provide retainer apparatuses that may address these problems.

SUMMARY OF THE DISCLOSURE

Described herein are aligner retainers for use following completion of an orthodontic treatment plan (e.g., after a series of aligners has been worn to reposition the teeth) and method of making and using them. These aligner retainers may address the problem with traditional retainer and may stabilize the patient's occlusion. In particular, described herein are apparatuses (e.g., devices, apparatuses, including retainers) and methods of making and using them. The retainers described herein are configured to provide additional support following a treatment plan to prevent relapse by determining (e.g., using software as described herein) regions in which the patient's teeth are most likely to vary from the target final position following treatment and may incorporate one or more features to prevent or limit release in the retainer. For example, these aligners may be specifically reinforced in a customized or customizable manner while still providing enhanced comfort. In some examples, these aligners may pro-actively address relapse potential. The methods and apparatuses, including software for performing these methods, may be configured to analyze the patient's current and/or one or more prior previous orthodontic treatment plan and incorporate potential post-treatment movements of the teeth into the retainer fabrication. Thus, a customized retainer may be structurally re-enforced to prevent predicted post-treatment movements of the teeth. Also described herein are methods and apparatuses (e.g., software) for predicting the likelihood of a relapse (or other undesirable tooth movements) following completion of a treatment plan specific to a patient.

Any of the retainers described herein may include one or more features that add a reciprocal force or a resistance to relapse force to provide a counter-balance force to a tooth that is prone to relapse in the opposite direction of the relapse. Therefore a retainer may be not a passive retainer, but may be an active retainer that may apply a pressure or a resistance to movement as a counter-pressure so that the teeth are less likely to relapse. The counter-force(s) may be strategically applied (e.g., by one or more features in the retainer) based on the patient's particular case including any movement that was occurring during the case so as to better prevent relapse. In some cases the counter-force(s) may be differentiating in amount and/or direction within the same apparatus.

For example, described herein are methods of custom designing a retainer for a patient and/or methods of creating a retainer for a patient, comprising: estimating a stability estimate for one or more of the patient's teeth from a model of the patient's teeth and a current orthodontic treatment plan for the patient, wherein the stability estimate corresponds to a likelihood that the one or more of the patient's teeth will move out of a target final position from the current orthodontic treatment plan; and generating a model of the retainer, wherein the retainer is reinforced in one or more regions configured to be in communication with the one or more of the patient's teeth having a stability estimate that exceed a threshold. The current orthodontic treatment may be in a treatment plan that is in process or a treatment plan that has been completed. The movement of a tooth from the target final position of the current orthodontic treatment plan may include moving the current treatment plan out of an achieved final position from orthodontic treatment (including a completed orthodontic treatment plan).

In general, the model of the retainer may be a digital model. In some examples the model may be configured to be worn. Thus, any of these methods may include forming the retainer. The retainer may be formed from the model (e.g., digital model) or a plan (e.g., schematic, instruction, specification file, etc.) by a manual or automatic process, including three-dimensional (3D) printing, thermoforming, etc. Thus, any of these methods may include forming (e.g., fabricating) the retainer from the model of the retainer.

In any of these methods, estimating may include using one or more prior treatment plans specific to the patient in addition to the current orthodontic treatment plan for the patient to estimate a final post-treatment relapse position for the one or more of the patient's teeth. In some examples, the retainer may be prepared (e.g., ordered, designed, fabricated and optionally delivered to the patient) after one or more orthodontic treatments are completed. Thus in some examples the subject may have multiple aligner orders.

In any of these methods, estimating the stability estimate may include using a machine-learning algorithm trained on a plurality of treatment plans and tooth models. For example, estimating may include estimating a plurality of stability estimates, wherein each stability estimate corresponds to a different tooth of the patient's teeth. In some examples, for each stability estimate that exceeds the threshold, the method may determine a force vector corresponding to a movement of the one or more of the patient's teeth beyond the target final position. For example, generating the model of the retainer may comprise including reinforcement to counter the force vector. Estimating the stability estimate for one or more of the patient's teeth may include estimating a stability estimate for one or more of: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction, Class II treatment relapse, and Class III treatment relapse. In some examples, generating the model of the retainer may comprise including reinforcement of the one or more regions by making the retainer thicker, stiffer and/or having a longer trim line in the one or more regions configured to be in communication with the one or more of the patient's teeth. Generating the model of the retainer may comprise including reinforcement of the one or more regions by including a strut or the retainer thicker in the one or more regions configured to be in communication with the one or more of the patient's teeth. In any of these methods, generating the model of the retainer may comprise including reinforcement of the one or more regions so that the retainer applies a force on the one or more of the patient's teeth having a stability estimate that exceed a threshold to overcorrect the one or more of the patient's teeth.

Relapse is known to occur after treatment with orthodontics alone or orthodontic treatment combined with orthognathic surgery. Functional and fixed appliances, tongue spurs or cribs, elastics, wires and orofacial myofunctional therapy (OMT) have all been proposed to reduce or eliminate relapse. OMT is a series of exercises the patient is to perform that improve the strength and help maintain the positioning and coordination of the mouth and throat muscles. The methods and apparatuses described herein may provide beneficial interferences between the upper and lower retainers that may have the same effect and benefit as OMT, by serving as a reminder to the patient to maintain the post-treatment position of the mandible. The retainers for the upper and lower arches described herein may be configured with an interference specifically intended to stimulate the orofacial nerves and muscles and to bring the patients attention to the position of the mandible and correct it as necessary. Incorrect positioning of the mandible is lessened thereby reducing the possibility of relapse.

For example, it is known that Class II treatment, and Class III treatment which adjust anterior/posterior tooth position and jaw position has a high probability of relapse. The apparatuses and methods described herein may receive the Class II or Class III treatment as an input to the relapse predictor and the design of the retainer. Interferences between the upper and lower retainer may be beneficial in minimizing relapse, as they may "remind" the subject's nerves to maintain the final treatment position of the jaw.

Also described herein are methods of custom designing a retainer for a patient comprising: estimating, from a digital model of the patient's teeth and a current orthodontic treatment plan for the patient, a stability estimate for one or more of the patient's teeth, wherein the stability estimate corresponds to a likelihood that the one or more of the patient's teeth will move out of a target final position from the current orthodontic treatment plan; and generating a digital model of the retainer, wherein the retainer is reinforced in one or more regions configured to be in communication with the one or more of the patient's teeth having a stability estimate that exceed a threshold.

Any of these methods may be computer-implemented methods. For example, described herein are computer-implemented method of custom designing a retainer for a patient, the method comprising: estimating, in a processor, from a model of the patient's teeth, a current orthodontic treatment plan for the patient, a stability estimate for one or more of the patient's teeth, wherein the stability estimate corresponds to a likelihood that the one or more of the patient's teeth will move beyond a target final position from the current orthodontic treatment plan in one or more relapse categories including: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction; and generating a model of the retainer, wherein the retainer is modified in one or more regions configured to be in communication with the one or more of the patient's teeth having a stability estimate that exceed a threshold.

Also described herein are computer-implemented method of custom designing a retainer for a patient, the method comprising: estimating, in a processor, from a digital model of the patient's teeth, a current orthodontic treatment plan for the patient, a stability estimate for one or more of the patient's teeth, wherein the stability estimate corresponds to a likelihood that the one or more of the patient's teeth will move beyond a target final position from the current orthodontic treatment plan in one or more relapse categories including diastema relapse and general spacing relapse, anterior or posterior mesial/distal or buccal/lingual or rotational relapse, teeth retraction/proclination (e.g., lingual crown tip in/buccal crown tip out) relapse, deep bite relapse, extrusion/intrusion relapse, arch expansion relapse and/or extraction; and generating a digital model of the retainer, wherein the retainer is modified in one or more regions configured to be in communication with the one or more of the patient's teeth having a stability estimate that exceed a threshold.

For example, estimating may include using a prior treatment plan specific to the patient in addition to the current orthodontic treatment plan for the patient to estimate a final post-treatment relapse position for the one or more of the patient's teeth.

Any of these methods may include forming the retainer from the digital model of the retainer.

Estimating the stability estimate may comprise using a machine-learning algorithm trained on a plurality of treatment plans and digital tooth models. In some examples estimating comprises estimating a plurality of stability estimates, wherein each stability estimate corresponds to a different tooth of the patient's teeth. He methods and apparatuses described herein may include, for each stability estimate that exceeds the threshold, determining a force vector corresponding to a movement of the one or more of the patient's teeth beyond the target final position. For example, generating the digital model of the retainer may comprise including reinforcement to counter the force vector or an additional vector.

Estimating the stability estimate for one or more of the patient's teeth may include estimating a stability estimate for one or more of: diastema relapse and general spacing relapse, anterior or posterior mesial/distal or buccal/lingual or rotational relapse, teeth retraction/buccal crown tip out relapse, deep bite relapse, extrusion/intrusion relapse, arch expansion relapse and/or extraction, Class II treatment relapse, and Class III treatment relapse.

Generating the digital model of the retainer may comprise including reinforcement of the one or more regions by making the retainer thicker and/or stiffer in the one or more regions configured to be in communication with the one or more of the patient's teeth. Generating the digital model of the retainer may comprise including reinforcement of the one or more regions by including a strut or the retainer thicker in the one or more regions configured to be in communication with the one or more of the patient's teeth. Generating the digital model of the retainer may comprise including reinforcement of the one or more regions so that the retainer applies a force on the one or more of the patient's teeth having a stability estimate that exceed a threshold to overcorrect the one or more of the patient's teeth.

Any of the methods described herein may be performed by a system (including software, or a non-transitory computer-readable medium). For example, described herein are non-transitory computer-readable medium including contents that are configured to cause one or more processors to perform a method comprising: estimating, from a digital model of the patient's teeth and a current orthodontic treatment plan for a patient, a stability estimate for one or more of the patient's teeth, wherein the stability estimate corresponds to a likelihood that the one or more of the patient's teeth will move out of a target final position from the current orthodontic treatment plan; and generating a digital model of a retainer, wherein the retainer is reinforced in one or more regions configured to be in communication with the one or more of the patient's teeth having a stability estimate that exceed a threshold.

For example, described herein are non-transitory computer-readable medium including contents that are configured to cause one or more processors to perform a method comprising: estimating, from a model of the patient's teeth and a current orthodontic treatment plan for a patient, a stability estimate for one or more of the patient's teeth, wherein the stability estimate corresponds to a likelihood that the one or more of the patient's teeth will move out of a target final position from the current orthodontic treatment plan; and generating a model of a retainer, wherein the retainer is reinforced in one or more regions configured to be in communication with the one or more of the patient's teeth having a stability estimate that exceed a threshold.

As mentioned, estimating may comprise using one or more prior treatment plans specific to the patient in addition to the current orthodontic treatment plan for the patient to estimate a final post-treatment relapse position for the one or more of the patient's teeth. The contents may be further configured to cause the one or more processors to form the retainer from the model of the retainer. In some examples estimating the stability estimate comprises using a machine-learning algorithm trained on a plurality of treatment plans and tooth models. For example, estimating may comprise estimating a plurality of stability estimates, wherein each stability estimate corresponds to a different tooth of the patient's teeth. The contents may be further configured to cause the one or more processors to determine, for each stability estimate that exceeds the threshold, a force vector corresponding to a movement of the one or more of the patient's teeth beyond the target final position.

In some examples generating the model of the retainer comprises including reinforcement to counter the force vector. As mentioned, estimating the stability estimate for one or more of the patient's teeth may comprise estimating a stability estimate for one or more of: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction, Class II treatment relapse, and Class III treatment relapse. In some examples generating the model of the retainer comprises including reinforcement of the one or more regions by making the retainer thicker, stiffer and/or having a longer trim line in the one or more regions configured to be in communication with the one or more of the patient's teeth.

Generating the model of the retainer may comprise including reinforcement of the one or more regions by including a strut or the retainer thicker in the one or more regions configured to be in communication with the one or more of the patient's teeth. For example, generating the model of the retainer may comprise including reinforcement of the one or more regions so that the retainer applies a force on the one or more of the patient's teeth having a stability estimate that exceed a threshold to overcorrect the one or more of the patient's teeth.

For example, a non-transitory computer-readable medium may include contents that are configured to cause one or more processors to perform a method comprising: estimating, in a processor, from a model of the patient's teeth, a current orthodontic treatment plan for a patient, a stability estimate for one or more of the patient's teeth, wherein the stability estimate corresponds to a likelihood that the one or more of the patient's teeth will move beyond a target final position from the current orthodontic treatment plan in one or more relapse categories including: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction; and generating a model of a retainer, wherein the retainer is modified in one or more regions configured to be in communication with the one or more of the patient's teeth having a stability estimate that exceed a threshold.

A non-transitory computer-readable medium may include contents that are configured to cause one or more processors to perform a method comprising: estimating, in a processor, from a digital model of the patient's teeth, a current orthodontic treatment plan for a patient, a stability estimate for one or more of the patient's teeth, wherein the stability estimate corresponds to a likelihood that the one or more of the patient's teeth will move beyond a target final position from the current orthodontic treatment plan in one or more relapse categories including: diastema relapse and general spacing relapse, anterior or posterior mesial/distal or buccal/lingual or rotational relapse, teeth retraction/proclination (e.g., lingual crown tip in/buccal crown tip out) relapse, deep bite relapse, extrusion/intrusion relapse, arch expansion relapse and/or extraction, and generating a digital model of a retainer, wherein the retainer is modified in one or more regions configured to be in communication with the one or more of the patient's teeth having a stability estimate that exceed a threshold.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIGS. 4A-4E illustrate another example of a method of modifying a retainer to prevent or eliminate relapse.

DETAILED DESCRIPTION

Figure 1A:
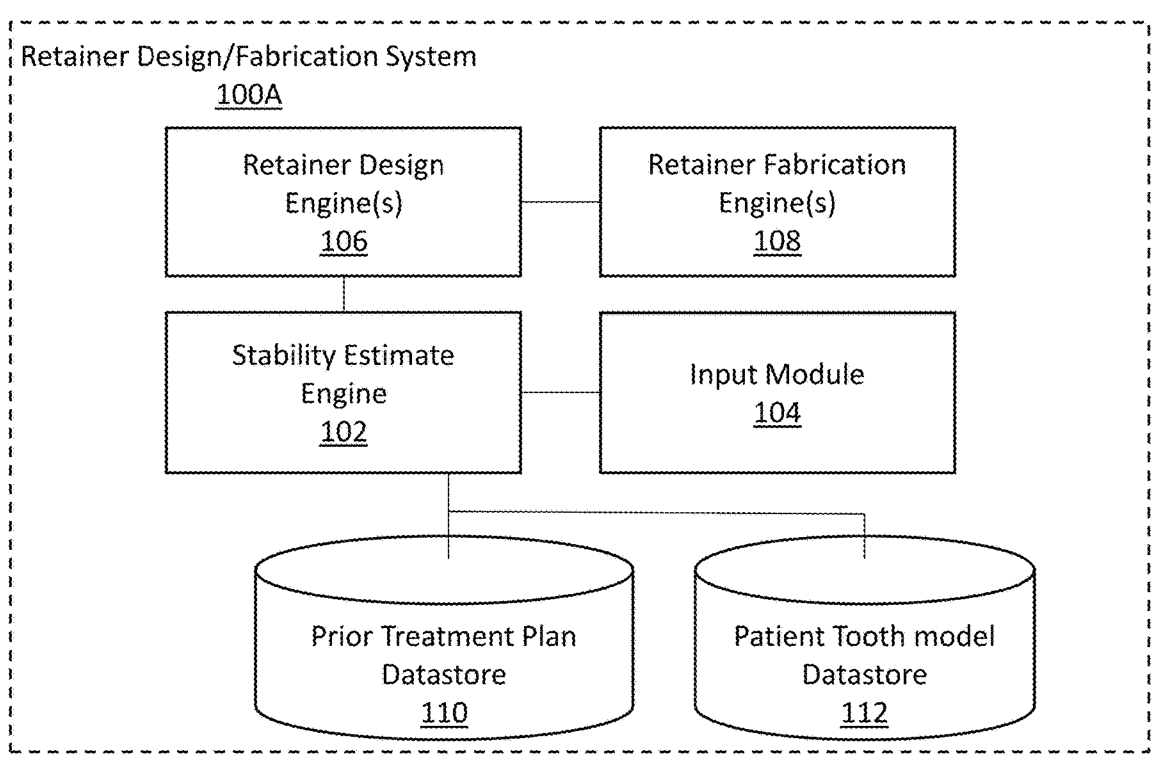
FIG. 1A is an example of a schematic of a retainer design system (or retainer design and fabrication system).

Described herein are apparatuses (e.g., devices, systems, and in particular retainers), for customized retainers to prevent relapse. In particular, described herein are methods and apparatuses for designing customized retainers specifically reenforce and prevent movement of one or more teeth having a higher likelihood of moving out of alignment following completion of an orthodontic treatment plan.

The methods and apparatuses described herein may determine the likelihood of movement (e.g., relapse or other undesirable movements) following an orthodontic treatment plan. These methods and apparatuses may use the patient's initial and/or current tooth position (e.g., based on a digital model of the patient's dental arch(s)), the patient's current treatment plan, and in some examples, previous treatment plant, including completed or incomplete treatment plans. For example, these methods and apparatuses may take into account tooth movements during previous orthodontic treatments.

The mobility of teeth (including relapse) can occur due to physiology, due to occlusion, due to orthodontic tooth movement, or due to disease and/or a combination of these factors and not limited to these. Mobility is usually graded clinically by applying pressure with the ends of two metal instruments (e.g. dental mirrors) and trying to rock a tooth gently in a bucco-lingual direction (towards the tongue and outwards again). Usually, using the fingers is not reliable as they are too compressible and will not detect small increases in movement. Clinicians often assess the status of a tooth by estimating its mobility. Because teeth are not ankylosed, or osseointegrated as are implants, but are suspended in the alveolar bone by a network of collagenous fibers, they exhibit a degree of physiological mobility. The magnitude of this movement has been used to distinguish between physiological and pathological tooth mobility, with up to 0.2 mm regarded as physiological. Up to 0.2 mm of slight physiological mobility may accommodate forces on the teeth during chewing or mastication without damaging teeth or accommodation during generally jaw movements. There are multiple indices that measure and index tooth mobility, and many of these reference normal physiological tooth movement as a horizontal or mesial-distal mobility of <0.2 mm.

However, abnormal, pathologic tooth mobility occurs when the attachment of the periodontal ligament to the tooth is reduced (attachment loss), or if the periodontal ligament is inflamed, such as during disease. Generally, the degree of mobility is inversely related to the amount of bone and periodontal ligament support left. Orthodontic tooth movement, however, does increase tooth mobility beyond the physiological amount, but the key is at the end of orthodontic treatment, that the teeth are place in a stable position and within their physiological positions and within the physiological tooth mobility parameters.

In general, retainers may prevent relapse and holding physiological tooth movement. For example, Hawley retainers are known as the "classic" removable orthodontic retention device and, as such, are a widely prescribed orthodontic retainer appliances. Hawley retainers are comprised of a plastic or acrylic base, which fits against the lingual aspects of the teeth/soft tissues, and stainless steel wires that contour around the buccal surfaces of the anterior teeth to hold the teeth in place. Wire clasps are typically used to secure the retainer in place. While effective in retention, teeth can also relapse in the anterior teeth area as they are held between acrylic and a wire if the retainer is not worn, or the teeth have the possibility to move within their physiologically limits, or back to their original position, or somewhere in between.

Hawley retainers are removable, but they utilize a metal wire on the buccal of the anterior teeth, component in order to produce pressure on the teeth and/or adjustable springs to allow for minor movement if needed. This pressure from the metal wire helps secure teeth in the horizontal plane and usually not the vertical plane. The wire components are adjustable. The labial bow and the clasps can be tightened as needed to add pressure back on the teeth to help hold them in place due to their potential physiological mobility or potential for shifting or relapse. The tightening of labial bow at adjustments can help deliver this resistance force.

Clear retainers can also be referred to as "invisible retainers", "vacuum-formed retainers (VFR)", and/or "thermoplastic retainers". This retainer type has a high patient acceptance level due to the esthetic quality of the plastic. The first invisible retainer described was made of vacuum-formed thermoplastic material that adapted closely to all the surfaces of the teeth. These retainers are durable, esthetic, easy to clean, easy to fabricate, and easy to deliver. However, relapse can occur due to multiple reasons, such as non-compliance with wear, supra-crestal fibers rebounding and pulling the teeth back toward their initial state, movement of the teeth in reaching a new state of equilibrium and/or the give or relaxation in the retainer material that allows the teeth to relapse.

The methods and apparatuses described herein may customize a patient's retainer based on the specific tooth movements in previous orthodontic treatments and/or tendency of relapse and may prevent relapse based on the specific tooth movement undergone by a tooth (or each of multiple teeth) and the tooth's (or the teeth's) tendency to relapse.

A typical relapse can be seen in following, non-comprehensive, categories: diastema relapse and general spacing relapse, especially anterior, rotation relapse, posteriors mesial/distal relapse, teeth retractation relapse (e.g., buccal crown tip out relapse), deep bite relapse, extrusion relapse, and arch expansion relapse (e.g., collapse of the arch) and/or extraction.

The methods and apparatuses may determine a stability estimate based on a predicted likelihood that one or more (or all) of the patient's teeth will move out of the target final position from the current orthodontic treatment plan. The predicted likelihood that a particular tooth (or set of teeth) will move out of a target final position may be referred to generally and equivalently as the likelihood of relapse and may be expressed as a numeric value or an array of numeric values. In some examples the stability estimate, e.g., the likelihood of relapse, may be a numeric value or set of numeric values that indicate the likelihood (scaled or absolute) that a particular tooth or set of teeth will move out of the target final position. In some examples the likelihood of relapse may include information specific to the type and/or direction and/or category of relapse. For example, the predicted likelihood of relapse may include one or more relapse categories, including those discussed above: diastema relapse, general spacing relapse (especially anterior), rotation relapse, posteriors mesial/distal relapse, posteriors lingual/buccal relapse, teeth retractation relapse (e.g., buccal crown tip out relapse), deep bite relapse, extrusion relapse, and arch expansion relapse (e.g., collapse of the arch). A predicted likelihood may be provided for all or a subset of the teeth in the patient's dental arch. In some examples an array or set of predicted likelihoods for specified relapse categories may be provided for each or a subset of the patient's teeth. In some examples the predicted likelihood may also indicate a predicted vector matrix indicating a direction and/or magnitude for the movement beyond the target final position (e.g., relapse).

In general, the custom retainers may be configured to be worn over the patient's teeth following completion of a treatment plan and may be reinforced to prevent relapse based specifically on the predicted likelihoods of relapse. For example, any of the methods described herein may include determining one or more active planned movement to be provided by the custom retainer, based on the patient's tooth position and/or based on retainer position and/or by varying the retainer wall thickness/stiffness, and/or by adding and removing materials and/or local force-applying elements (e.g., a smart activation feature, trim line adjustment, bite ramps, attachments, etc.) to enhance retention and prevent relapse.

The custom retainer may be configured to generate a design for a custom retainer in which the custom retainer is configured to prevent the relapse of one or more teeth based on the predicted likelihood of relapse for each tooth or sets of teeth. For example, when the likelihood of relapse for each tooth or set of teeth includes one or more categories, if the likelihood of relapse for a particular tooth in a particular category exceed a threshold level, which may be specific to a category and/or a tooth in the position of the tooth in a particular position (e.g., indexed by a tooth number, based on a universal or other tooth numbering system), the retainer may be configured to reinforce the retainer based on the category. For example, for the likelihood of relapse category of diastema relapse and general spacing relapse (e.g., anterior), the retainer may be configured to reinforce the teeth on either side of the potential diastema (such as for the anterior teeth, e.g., 11 and 21) on either lateral side to prevent the diastema forming or expanding. For the likelihood of relapse category of rotation relapse the custom retainer may be reinforced by adding a force activation opposite the direction the tooth may rotate and relapse. For the likelihood of relapse category of posteriors mesial/distal relapse, the custom retainer may be reinforced to prevent mesial/distal relapse. For the likelihood of relapse category of teeth retraction relapse or buccal crown tip out relapse, the custom retainer may be reinforced to add a buccal force activation so that the teeth do not procline forward. For the likelihood of relapse category of deep bite relapse, the custom retainer may be reinforced to add an intrusive component to the retainer. For the likelihood of relapse category of extrusion relapse the custom retainer may be reinforced to accept one or more attachments. For the likelihood of relapse category of arch expansion relapse (e.g., collapse of the arch), the custom retainer may be reinforced, e.g., to put a lingual to buccal force activation on the retainer. In general the configuration of the custom retainer, which may generally be referred to herein as a reinforcement, although the customization is not limited to reinforcing (e.g., stiffening) of the retainer material, may be performed automatically by a processor, or a system including the processor. The system may both analyze and determine the estimate for the stability estimate corresponding to the one or more likelihood(s) of relapse and may apply the stability estimate, e.g., the likelihood of release to design the custom retainer as described herein.

In general, the methods and apparatuses described herein may estimate the stability estimate, including an array of likelihoods of relapse for each of a plurality of relapse categories, based on the patient's initial or current tooth position (e.g., from a 3D digital model of the patient's teeth) and the current orthodontic treatment plan. In some examples the methods and apparatuses may also use one or more prior treatment plans, including failed or incomplete treatment plans, which may provide further information about the likelihood of relapse.

A stability estimate may be a single value, e.g., a numeric or quantitative value such as a score from 0-100 (or 0 to 1, etc. or any normalized range, or percentage), and/or a qualitative value, such as high/medium/low that may indicate an overall likelihood of relapse for a dental arch of a particular patient. Alternatively, the stability estimate may be provided that is specific to each tooth or group of teeth. The stability estimate may be based on a plurality of different likelihoods of release for each tooth that accounts for relapse in one or more categories, or types of relapse (e.g., diastema relapse and general spacing relapse, especially anterior, rotation relapse, posteriors mesial/distal relapse, posteriors lingual/buccal relapse, teeth retraction relapse, deep bite relapse, extrusion relapse, and arch expansion relapse, etc.). Alternatively or additionally, the stability estimate may be based on and/or may include a vector matrix that describes the predicted direction and/or predicted magnitude of force driving relapse, and in some examples the rotation. Each tooth of the dental arch (e.g., 1-16, 17-32 in the Universal Numbering System) may have an associated vector matrix and/or an associated one or more (e.g., an array) of relapse categories with a likelihood of relapse. Thus, the stability estimate may include information about the likelihood of relapse for each tooth or group of teeth and/or may include an overall stability estimate for the entire dental arch. The stability indicator may also or alternatively include the trajectory of initial to final tooth movement.

The stability estimate, and in particular the specific stability estimate for each tooth may be used to design a custom retainer that may prevent or reduce relapse of the tooth. For example, if the likelihood of relapse for the specific tooth shown is greater than a threshold value then the retainer may be reinforced based on the particular relapse categories having a likelihood of relapse that is greater than the threshold. Each relapse category may have a separate threshold value. In some example, each tooth and each relapse category for that tooth may have a separate threshold value, which may be predefined by the apparatus or method, or may be set or modified by a user (e.g., a dental practitioner, such as a dentist, orthodontist, dental technician, etc.). In some examples a generic threshold value may be used, at least initially. In variations in which the likelihood of relapse is described as a vector matrix for each tooth (indicating the direction and/or magnitude of post-treatment movement, e.g., relapse) is used, the vector matrix may be compared to a threshold value (which may itself be a threshold matrix) that may be compared to the vector matrix to determine if the retainer should be modified (e.g., reinforced) to prevent or limit relapse. This process may be iteratively or concurrently performed to form the retainer.

A modification of the retainer may generally be referred to as reinforcing the retainer and may include thickening a region of the retainer to prevent or limit relapse, and/or including one or more support structures (buttresses, beams, bite wings, ramps, wires, etc.) within or coupled to the retainer and/or including one or more attachment mating regions for coupling with an attachment to be placed on the teeth. The modifications (e.g., reinforcements) may be designed to specifically counteract the direction and magnitude (including rotational and translational movements) of relapse.

For example, described herein are apparatuses and methods for generating a stability estimate that may provide a quantitative and/or qualitative indication of how likely a patient's teeth are to relapse. The stability estimate may be a single value, summarizing the overall likelihood, and/or it may be multidimensional, including individual likelihoods for each tooth and/or for one or more categories of relapse for each tooth. Alternatively or additionally, rather than categories, the stability estimate may include a vector matrix indicating the likely direction and/or magnitude of relapse for each tooth. The vector matrix may be used rather than categories for each type of relapse, or in some cases in addition to including each type or category of relapse. For example, each tooth may include an individual stability estimate for one or more categories of relapse specific to that tooth. Thus, a stability estimate may include an array of tooth-specific values corresponding to individual or sup-stability estimates. These stability estimates for each tooth (or each category for each tooth) may be combined (e.g., as average, weighted average, sum, etc.) to determine an overall stability estimate. In some examples, if the stability estimate is too low, this may indicate that the jaw may not be successfully maintained, that an additional treatment may be recommended (e.g., to the treating clinician) as an alternative to a retainer. In some examples the stability estimate may be displayed chairside within an intraoral scanner interface, which may highlight risk factors. This may provide more guidance on viable treatment options.

In some cases the stability estimate may be used to determine a retainer design that is customized to the patient. Thus, described herein are methods and apparatuses (including systems) for designing and/or fabricating a retainer. For example, FIG. 1A is a diagram showing an example of a retainer design/fabrication system 100A. The modules of the retainer design/fabrication system 100A may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented as and/or can be used with one or more cloud-based engines. As used herein, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The retainer design/fabrication system 100A may include a computer-readable medium and may include a stability estimate engine(s) 102, an input module 104, a retainer design engine 106, and optionally, a retainer fabrication engine 108; the system may also include a prior treatment plan datastore 110 and a patient tooth model datastore 112. One or more of the modules/engines of the retainer design/fabrication system 100A may be coupled to one another (e.g., through the example couplings shown in FIG. 1A) or to modules not explicitly shown in FIG. 1A. The computer-readable medium may include any computer-readable medium, including without limitation a bus, a wired network, a wireless network, or some combination thereof.

The stability estimate engine 102 may implement one or more automated agents configured to learn likely relapse behavior for various tooth types and positions in treatment plans based on treatment plans, dental tooth models, and outcomes (e.g., post-outcome/relapse data). In various implementations, the stability estimate engine(s) 102 may implement one or more automated agents configured to determine a likelihood or relapse for one or more (or all of) a subject's teeth.

Figure 1B:
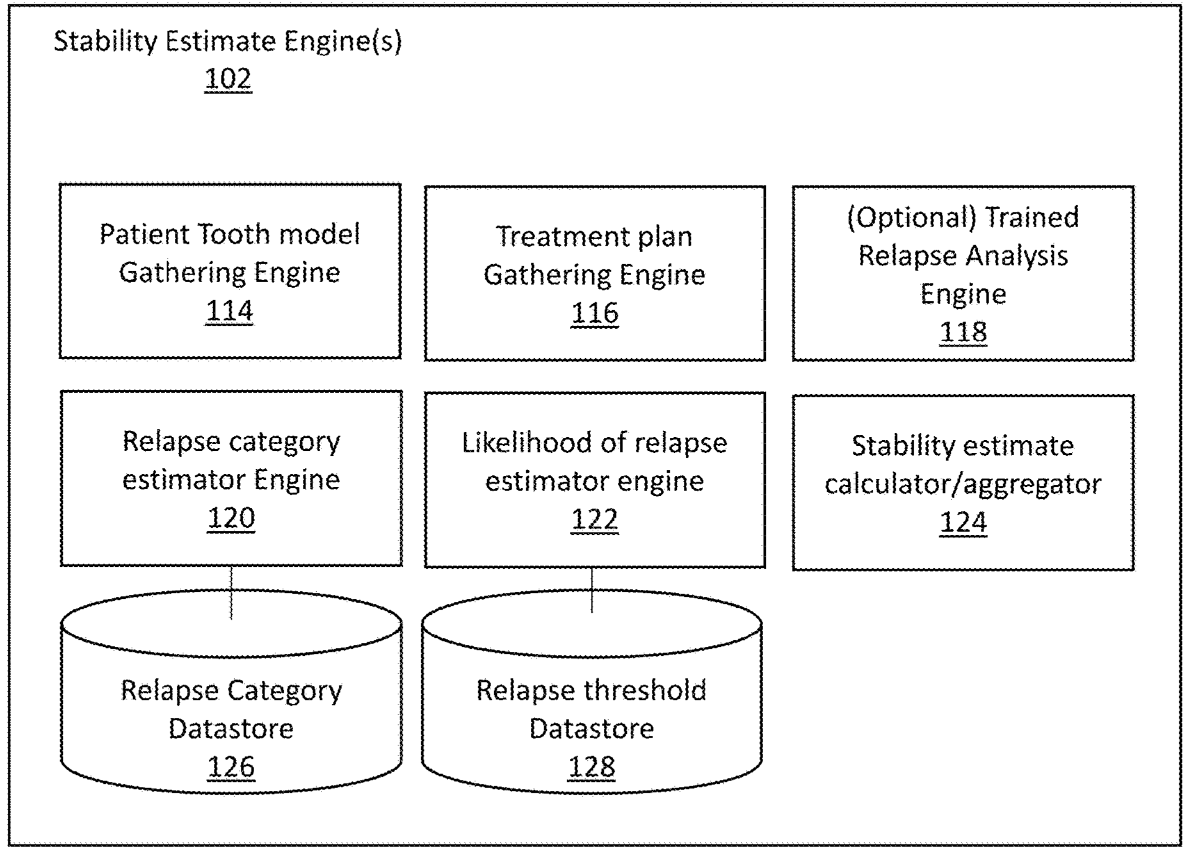
FIG. 1B is an example of a stability estimate engine that may be used with a retainer design system or may be used independently, including as part of a treatment plan modification system.

As shown in FIG. 1B, the stability estimate engine 102 may include one or more modules to gather patient-relevant data used for the estimation of the likelihood of relapse. For example, the stability estimate engine 102 may include a patient tooth model gathering engine 114, and a treatment plan gather engine 116. The tooth model gathering image may collect one or more models of the patient's teeth, including the current tooth position digital model and/or initial tooth position digital model, and/or digital models of any number of intermediate tooth position digital models, e.g., corresponding to stages of a current or prior treatment plan. The stability estimate engine 102 may also include a trained relapse analysis engine 118, which may estimate the likelihood of relapse for one or more (e.g., a specified) teeth. The stability estimate engine may also include a relapse category estimator engine 120 (or alternatively/additionally a vector matrix relapse estimator engine, not shown). The stability estimate engine 102 may also include a likelihood of relapse estimator engine 122 and a relapse category datastore 126 and a relapse threshold datastore 128. Finally, the stability estimate engine 102 may include a stability estimate calculator/aggregator 124. These engines/modules may be used to perform the functions they refer to, which are further described herein.

The retainer fabrication engine(s) 108 may implement one or more automated agents configured to fabricate an aligner. The retainer fabrication engine(s) 108 may be part of 3D printing systems, thermoforming systems, or some combination thereof.

Example I

Figure 2A:
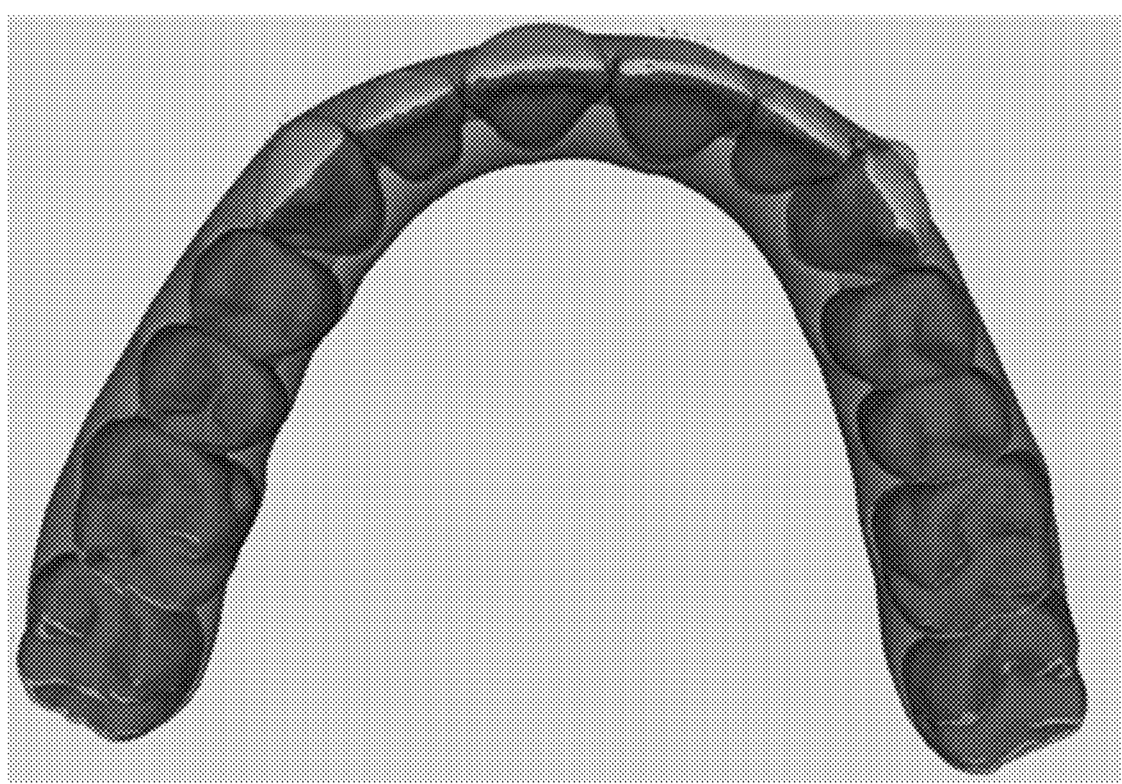
FIGS. 2A-2C illustrate one example of a digital model of a patient's dental arch in a final (target) configuration, graphically showing stability estimates based on the likelihood that the teeth will relapse.
Figure 2B:
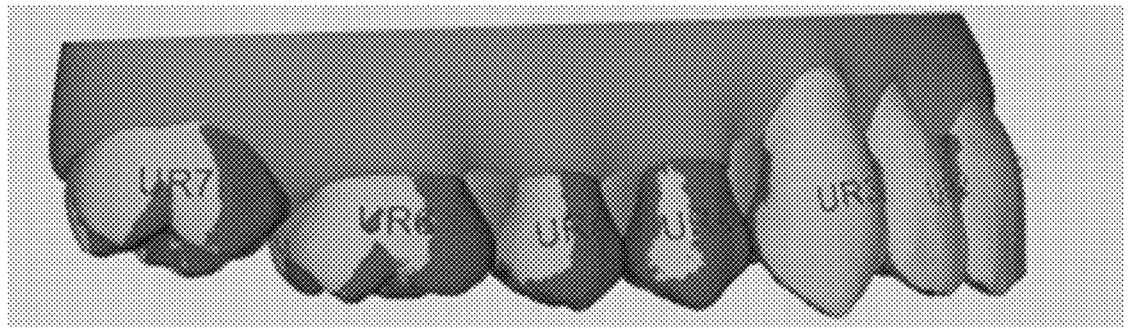
Figure 2C:
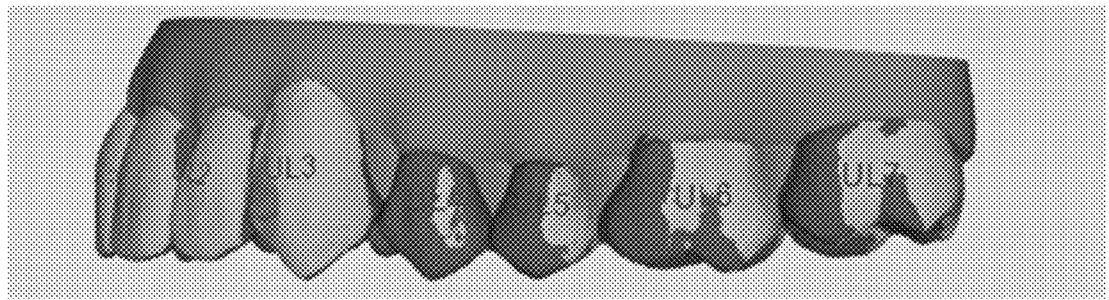

The methods and apparatuses described herein may be configured to prevent diastema between the patient's teeth, e.g., similar to using a c chain/power chain retainer to actively prevent space opening. For example, FIG. 2A shows one example of a digital model of a patient's dental arch in a final (target) configuration. In this example, the model graphically illustrates the stability estimate based on the likelihood that the teeth will move out of the target final positions (e.g., likelihood of relapse). In FIG. 2A, the darker shading on the lingual and occlusal sides (e.g., the dark blue) shows the teeth shape/position that could be used to build retainer to tighten the arch. In this example, the anteriors have lingual retraction and posteriors have mesialization retraction. FIGS. 2B and 2C show right side and left side views, respectively.

Example II

Figures 3A, 3B, 3C:
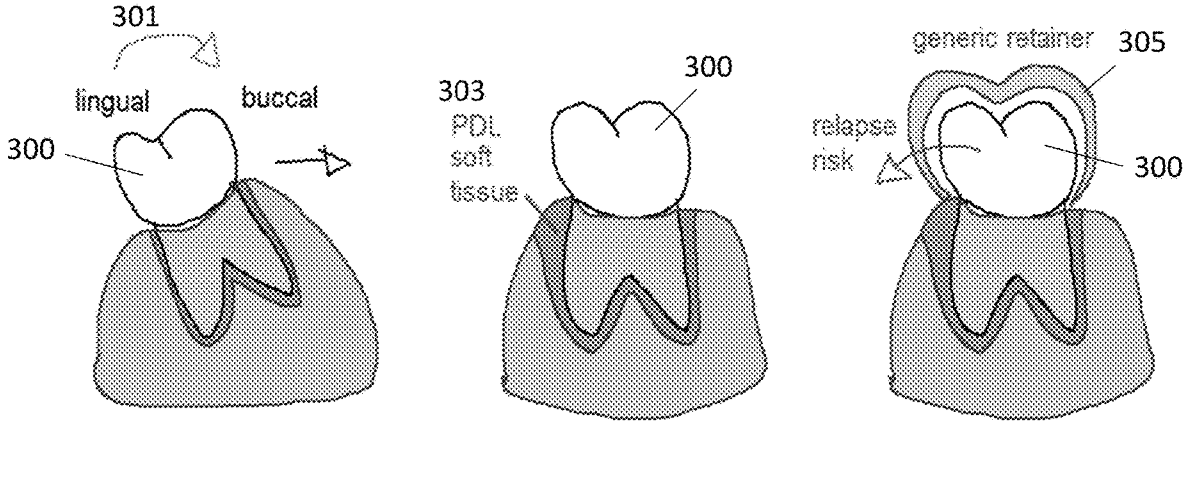
FIGS. 3A-3D illustrate a method of estimating relapse likelihood for a single tooth and reinforcing a retainer to prevent or eliminate relapse.

FIGS. 3A-3D illustrate a theoretical model for one example of tooth relapse. As shown in FIG. 3A, the tooth may be aligned by tipping 301 it buccally (from the lingual to buccal direction) as shown. When a tooth 300 does arch expansion, it typically leaves behind a wake of soft tissue 303. In some examples the tissue may move as well (e.g., with a diastema closure). In FIGS. 3A-3D, the tooth 300 is a molar that is part of a molar arch expansion using a treatment plan for applying sequential aligners. In FIG. 3B, the soft tissue region 303 is a high-risk region for relapse, for at least some time period after the treatment plan is completed. Unless the tooth 300 is held in place, it may relapse into this wake 303. FIG. 3C shows one example of the use of a typically retainer 305 that may hold the tooth crown in place. The retainer 305 shown is not reinforced to prevent or reduce the specific risk of relapse that may occur, and to prevent a relapse back to a more lingually tipped position. Thus, in some cases relapse back to a tipped position may occur. Described herein are methods and apparatuses that may predict the likelihood that relapse will occur in this situation for a specific patient undergoing a specific treatment plan. The likelihood of relapse of this tooth in this specific category of relapse, e.g., posteriors lingual/buccal relapse, may depend upon the patient's teeth (and related anatomy, such as periodontal ligaments, gingiva, etc.), as well as the stage(s) during the treatment plan in which the tooth was moved in this (or another) direction. Such factors are complex and would be difficult to estimate without the aid of the methods and apparatuses described herein. In some cases it may be particularly helpful to use one or more prior treatment plans (and outcomes). This information may be used to generate a stability estimate for the patient's teeth that includes this tooth and synthesizes the likelihood or relapse across multiple categories of release for each tooth in the patient's arch.

Figure 3D:
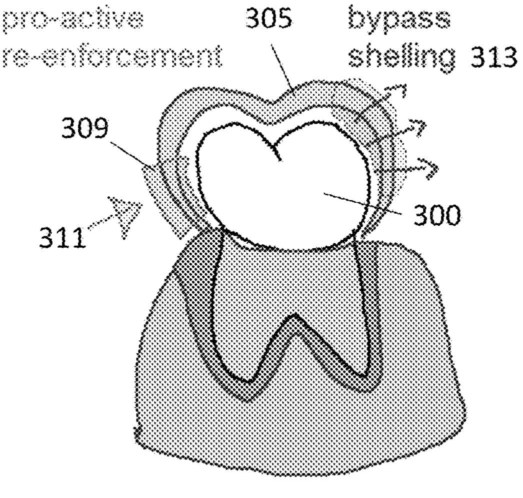

In this example, the stability estimate for this tooth may include a vector matrix and/or one or more relapse categories that describe the likelihood of relapse. This vector matrix and/or relapse category value(s), representing the likelihood of relapse, may be compared to a threshold value as described and if they exceed or equal the threshold value, the retainer may be reinforced to limit or prevent the relapse. In FIG. 3D the retainer 305' is also a polymeric shell retainer that has been modified to thicken a portion of the retainer that can counteract 311 the relapse vector identified. Thus, the final retainer is a polymeric shell retainer that includes one or more regions that have been modified to counter relapse movement following completion of the current treatment plan. Thus, the retainer may be proactively re-enforced in one or more areas of highest relapse risk and/or alter the shape of the appliance, using bypass mechanics, to remove any surface contacts that might promote relapse. Thus, the retainer may mitigate the risk of relapse by strategically and structurally reinforcing the region(s) of the retainer in which relapse risk is highest. For example, these regions may be made thicker and/or stiffer. In some examples the retainer may be formed by a 3D printing method. The retainer may be printed of different materials (e.g., materials having different modulus value) that may allow stiffer regions to be seamlessly integrated with less stiff regions.

In any of these methods and apparatuses the retainer may be designed with one or more bypass regions ("bypass shelling") that may avoid or reduce unwanted contacts or forces that may lead to relapse. In FIG. 3D, a bypass region 313 is shown.

In general, the retainers described herein may apply no significant forces on the arch in the static configuration, in which the teeth are in the target final position, but may immediately respond to small changes, e.g., having a high load deflection, indicative of relapse.

Alternatively, in some example the retainer is configured to apply a force on the teeth in the static configuration (when the teeth are in the target final position), at a low level that is below the biological range of tooth movement, for example, depending on the type of movement, less than 15 g of force (e.g., less than 10 g, less than 5 g, less than 3 g, less than 2 g, less than 1 g, etc.). In some examples this may not result in active tooth movement, but may resist tooth movement); this may be a balanced passive force system, in contrast to other examples in which the proactive staging is not enough to move the tooth, but is enough to prevent relapse in the predicted direction. The retainer may be configured so that the force against the teeth may increase as the tooth moves to relapse.

FIG. 4A schematically illustrates an example of an outline of a tooth 400 (e.g., an incisor viewed from above) in an initial (unaligned) position, with the mesial (M) and distal (D) directional indicated. The treatment plan may apply a force to move, e.g., rotate, the tooth 400 as shown by the arrow 405 over the course of the treatment plan, so that the final position of the tooth 400 is aligned as desired into the target position shown in FIG. 4B. In some cases, as may be determined by the methods and apparatuses described herein, the tooth may have likelihood of relapse in the direction shown in FIG. 4C, tending to return (with matrix vector represented by arrow 407, showing a direction and magnitude of the relapse force) toward the initial, misaligned configuration of FIG. 4A. The methods and apparatuses described herein may be configured so that the retainer may be reinforced to have, in some cases even in the static configuration, a restoring force 409 countering the direction of the relapse. As shown in FIG. 4E the reinforcement may be configured so that the force resisting the relapse may increase with further relapse. This may be achieved, for example, by increasing the stiffness and/or thickness of the retainer in the region opposing the direction of relapse. Thus, in some examples the vector matrix indicating the likelihood of relapse may be used to design the retainer; alternatively if the likelihood of relapse is described as a particular relapse category (e.g., rotation relapse in FIG. 4A-4E), the retainer may include two or more contact points within the tooth channel of the retainer, in positions that may be predetermined corresponding to the relapse category specific to that tooth or set of teeth.

Example III

Figure 5:
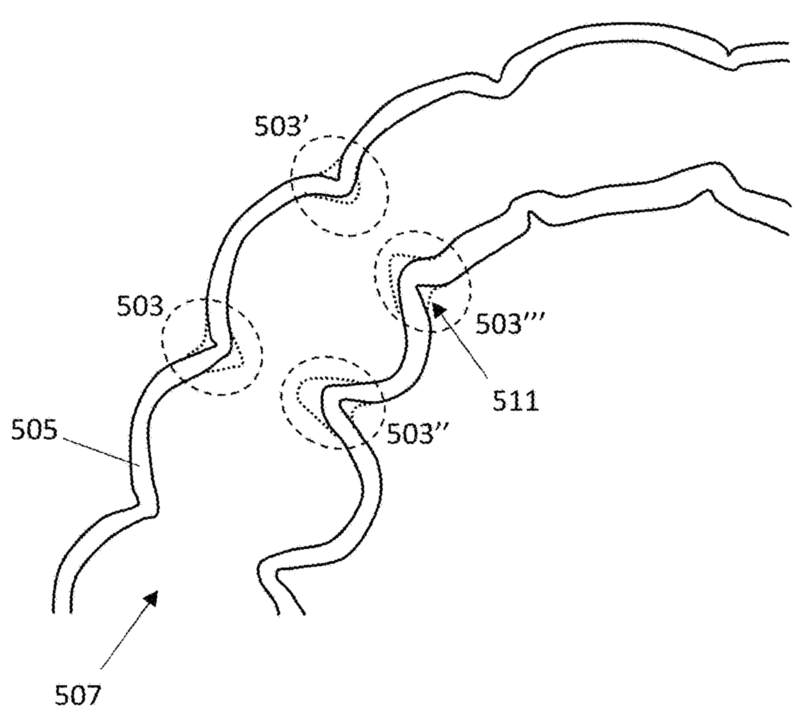
FIG. 5 shows an example of a retainer modified (e.g., reinforced) to prevent or eliminate relapse in a targeted manner specific to a subset of teeth (e.g., one tooth, two teeth, etc.) of the patient's dental arch to prevent relapse.

For example, to prevent extrusion relapse (e.g., canine extrusion relapse), one or more interproximal (IP) gripping regions and/or contact points may be used. FIG. 5 schematically illustrates one example of a retainer that is modified (e.g., reinforced) to prevent or limit canine extrusion relapse following a treatment plan. In this case, the retainer may be modified as shown when the likelihood of relapse for the canine is greater than a threshold, indicating that it is likely that extrusion relapse will occur. In this case, the retainer 505 may be modified, e.g., reinforced, to increase the interproximal gripping around the particular canine. In FIG. 5, four interproximal regions 503, 503', 503'', 503''' have been reinforced to extend more deeply into the interproximal region of teeth when the teeth are within the channel 507 of the shell retainer; the portion of the retainer behind these interproximal projections 511 may also be thickened or made stiffer. Enhanced interproximal region gripping can be achieved using these reinforcements, which may inhibit rotation due to relapse. The retainer may be directly fabricated by 3D printing, for example, or by modifying a thermoformed retainer. These reinforcements may improve the interproximal gripping, as shown by FIG. 6.

Figure 6:
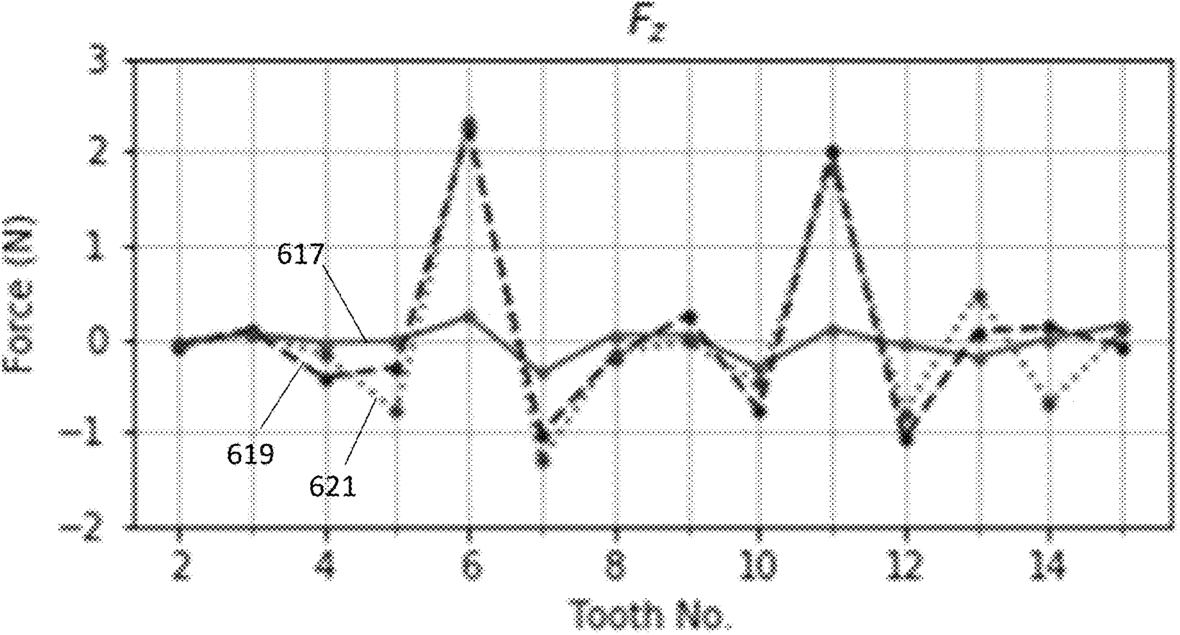
FIG. 6 is a graph illustrating forces on a traditional retainer as compared to a custom retainer as described herein.

FIG. 6, shows a graph of the force measurement (Fz) comparing the forces applied by an aligner such as the one shown in FIG. 5, with a standard retainer. The solid line 617 shows the force applied by the standard retainer, while the dashed line 619 shows the force applied by a retainer including IP gripping regions around canines T6 and T11. In this example, the canines (T6 and T11) relapse from extrusion with the force shown by the dotted line 621. Thus, when the canines (T6 and T11) relapse from extrusion the standard retainer may not create enough counteracting force (+Fz) to keep canine in place. However, modification of the retainer as described above, to include the IP gripping regions (reinforcements), the retainer may create much higher+Fz force to counteract the extrusion relapse, as shown by the overlap in the dashed 619 and dotted 621 lines.

Figures 7A, 7B:
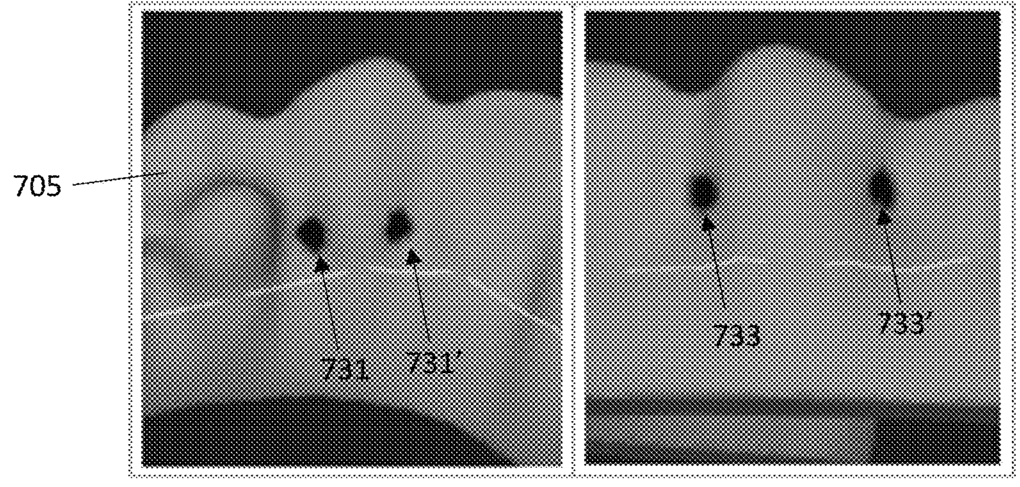
FIGS. 7A-7B illustrate an example of a portion of a retainer modified (e.g., reinforced) to prevent or eliminate relapse in a targeted manner specific to a tooth or multiple teeth to prevent relapse.
Figure 8:
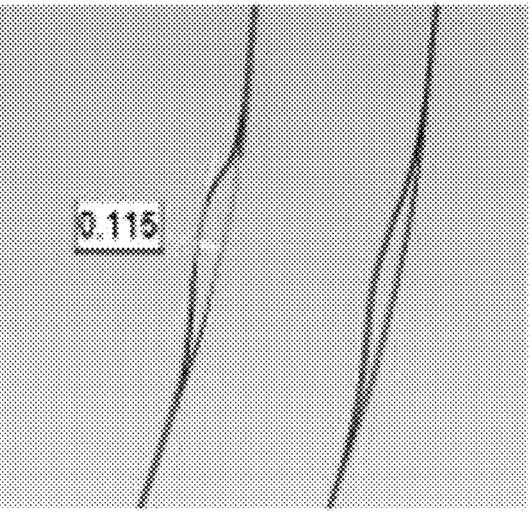
FIG. 8 is an enlarged view of a contact point included as a modification in the retainer shown in FIG. 7A.

Alternatively or additionally, the retainer may be modified (e.g., reinforced) to include one or more undercut contact points, as illustrated in FIGS. 7A-7B. In this example, FIG. 7A shows two contact points 731, 731' forming pressure areas, that are added close to the gingiva in the region of the retainer 705 corresponding to interproximal regions of a first canine (e.g., T6); similarly FIG. 7B shows another two contact points 733, 733' on either side of a second canine (T11). The contact points may be bumps or thickened regions and may be formed when the retainer is formed (e.g., by 3D printing) or may be added later. The contact points may project into the interproximal region and, when or if the canines begin to relapse, the contact points may prevent or limit relapse movement (e.g., rotation). FIG. 8 shows an example of a section through a retainer showing the contact points projecting outward from the surface of the retainer (to the left). The back of the projection may invaginate inward or may be flush with the outer surface of the retainer. The dimension shown in FIG. 8 (e.g., 0.115 mm) is for illustration only; other dimensions may be used and may be determined by the apparatus and methods described herein based on the forces to be countered (e.g., the force of the relapse).

Figure 9:
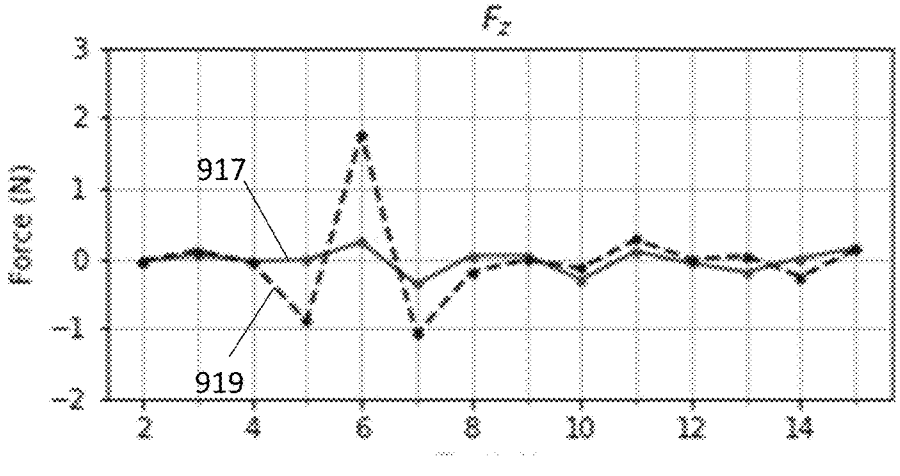
FIG. 9 is a graph illustrating the forces from individual teeth for a traditional retainer and a custom retainer as described herein.

FIG. 9 shows an example of another force measurement diagram comparing the force (Fz) capable of being applied by a standard (un-reinforced) retainer, shown by the solid line 917, compared with the force capable of being applied by a retainer modified (e.g., reinforced) to include contact points, shown by the dashed 919 line. In this example, when the canine (T6) relapses from extrusion, the standard retainer may not create enough counteracting force (+Fz) to keep canine in place; however, when one or more contact points 731, 731' are added close to gingiva line, as shown in FIG. 7A, the retainer may create much higher+Fz force to counteract the extrusion relapse. Force on the other teeth is generally unaffected and is comparable to the standard (unreinforced) retainer.

Figure 10:
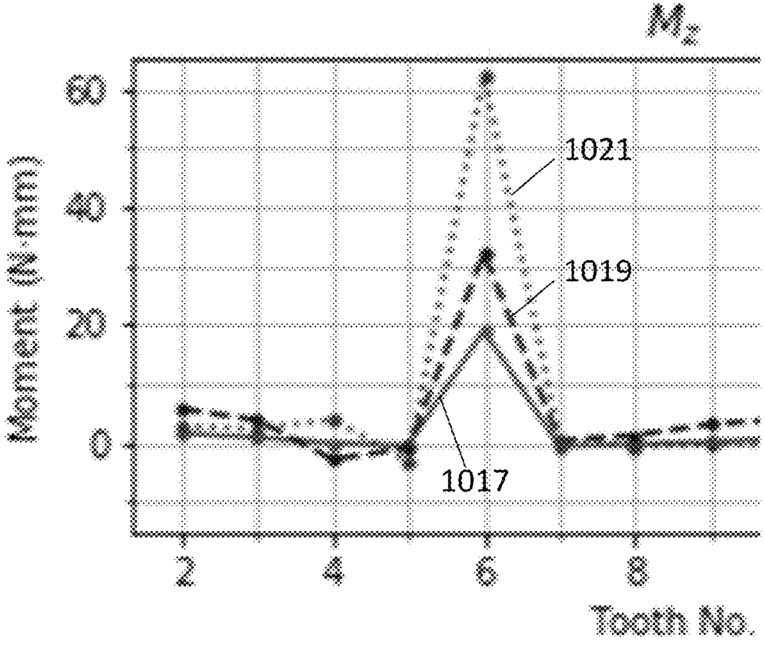
FIG. 10 is another graph illustrating the forces from individual teeth for a traditional retainer and a custom retainer as described herein, showing that the custom retainer may apply forces exceeding that necessary to prevent relapse.

To prevent rotation relapsing, contact points may play a more efficient role, as shown in FIG. 10. In this example, the force measurement (Mz) graph shows a comparison between the force applied when a canine (e.g., T6) relapses from rotation 1019, and the force applied by the standard retainer in response 1017, which may not be enough to create a sufficient counteracting moment (+Mz) to keep canine in place. In contrast, the use of contact points, as described above, may provide a force 1021 generating a counteracting moment (+Mz) that is increased as compared to the force applied by the relapse rotation of the canine, which may restore the corrected (target) configuration.

Example IV

In another example, the method and apparatus may determine that there is a likelihood of release on a tooth indicating a buccal crown tip out relapse and may modify (e.g., reenforce) the retainer in order to prevent or reduce the buccal crown tip out relapse. For example, the method or apparatus may determine a stability estimate based on the current and/or initial position of the teeth, the current treatment plan and (in some examples) a prior treatment plan. One or more of the teeth may have a likelihood of relapse (e.g., in the category of buccal crown tip out relapse) greater than a threshold. As a result, the retainer may be modified to prevent or limit buccal crown tip out relapse.

Figure 11:
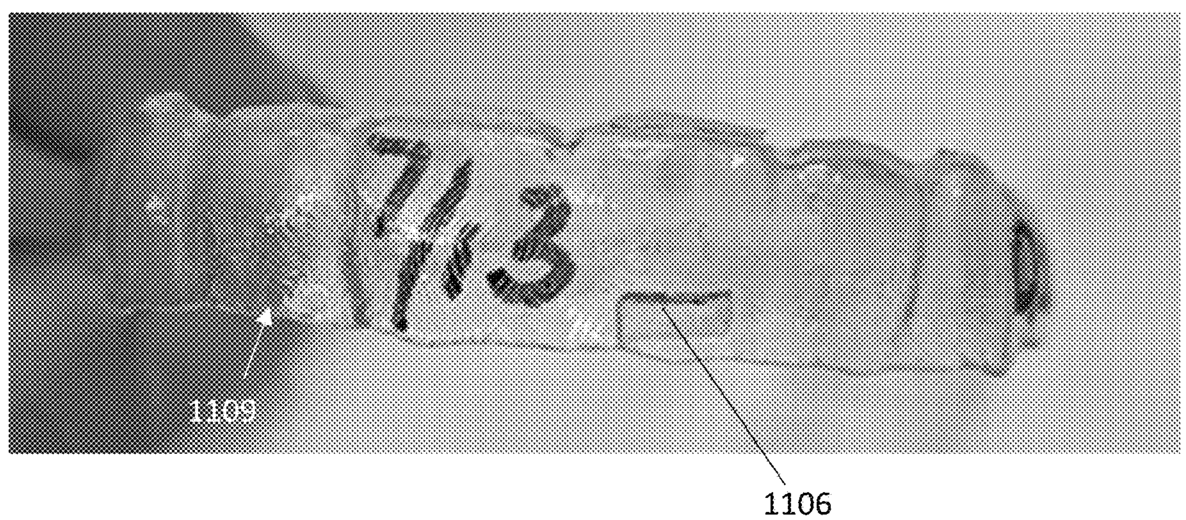
FIG. 11 shows one example of a retainer that has been modified (e.g., reinforced) as described herein to prevent a specific category of relapse in a specific tooth or set of teeth.

For example, the retainer may be modified to prevent buccal crown tip out relapse (e.g., teeth retraction relapse) by including a power ridge, comprising a thicker and/or stiffer thickness region and/or a straight cutline. Any of these methods may also change the aligner trim length, which may help to retain the tooth position. In practice the inventors have found that increasing aligner length (e.g. trim length) may increase retention force. Thus any of these methods and apparatuses may be configured to adjust (e.g., increase) aligner length, in addition to or instead of stiffness and thickness. For example, the methods and apparatuses described herein may allow automatically or manually (e.g., by allowing a user to) modify the length of the retainer trim, and/or modify the type of trim offered, such as, for example, straight vs scalloped cut trim. FIG. 11 illustrates an example of retainer that has been modified to include a thicker region extending in a ridge 1106. This configuration may result in a resultant force and force (e.g., My/Fx) ratio that may prevent retraction relapse. For example, the resultant force systems for a tooth (T8) identified as likely to relapse via buccal crown tip out relapse when using a stiffer material to form a ridge by direct printed (e.g., 3D printed) of the retainer using stiffer materials may achieve a sufficient force ratio to prevent or significantly reduce the relapse. A thermoformed retainer (ST30) had an Fx of between about −1 and −4.5 N, an My of between about −4 and −8 N-mm, and an My/Fx ratio of between about 1 and 3.5 (using a typical power ridge). This configuration is not likely to achieve the correct Mx/Fy ratio. However, directly printed (e.g., 3D printed) retainers using different resins (e.g., BC83, Tough1500) that are generally stiffer can achieve and even overshoot the desired Mx/Fy ratio when forming thicker thickness and straight cutlines as described above. For example, a 3D printed retainer formed, at least in part, of BC83 had an Fx of between about −2 and −5, an My of between about 25 and 45 N-mm, and an My/Fx ratio of between about −5 and −15; similarly a 3D printed retainer formed, at least in part, of Tough1500 had an Fx of between about −1 and −5, an My of between about 1 and 9 N-mm, and an My/Fx ratio of between about −0.5 and −3.

FIG. 11 also illustrates an example of the length of the trim length (e.g., trim line) 1109 of a retainer. In some examples the length of the retainer, including the length of the trim line may be extended in some regions may increase retention force. For example in some regions the trim length may have a scalloped edge as opposed to a more linear edge.

In general, the custom retainers described herein are more targeted in preventing relapse and may be more comfortable and lightweight (ad they are only reinforced in regions indicated as likely to relapse based on the methods and apparatuses described herein) than standard retainers and may also do a significantly better job at preventing or reducing relapse as compared to standard retainers. In general, these methods and apparatuses, including the retainers, may provide a better targeted mechanism of predicting and preventing a relapse. To achieve a comparable effectiveness, other retainers would need to be considerably thicker, and more uncomfortable, to offer the same level of reactive relapse prevention. By considering a patient's particular and specific risk factors for relapse, a retention appliance as described herein may be reinforced in a localized and specific manner for better comfort and function and longer effectiveness of the retainer appliance.

Thus, these methods and apparatuses may incorporate a treatment staging plan ("treatment plan") into the design of the retainer (e.g. "retention appliance") to identify the highest risk locations for orthodontic relapse. Relapse movements can be predicted based on determining the likelihood that teeth will tend to return to their original position, particularly where the periodontal tissue is vulnerably soft and may offer limited resistance, compared to moving into another new position where the periodontal tissue is still rigid and firm. The retainers described herein may be better focused on mitigating the risk of relapse.

The methods and apparatuses may therefore analyze a treatment plan to identify the locations (teeth) of highest relapse risk, which may be output as a stability estimate (or array of stability estimates specific to each of the patient's teeth in a dental arch or arches). The stability estimate(s) may be used to design the retainer to include structural one or more reinforcements that is/are targeted to prevent specific relapse locations and/or categories. This may be achieved by designing a resistance force within the retainer that is targeted to prevent specific relapse locations. The methods and apparatuses may therefore generate and output a design for a custom retainer. This design may be manually or automatically fabricated. For example, three-dimensional (3D) printing may be used to fabricate the retainer, which may allow localized thickening, shape design modification, or adjustment of material properties of strength and modulus. Any of these retainers may also incorporate bypass mechanics (bypass regions) to remove unwanted contacts that may promote relapse. In general, these retainers may be configured to offers little or no force or a resistance force when the teeth are in the target fine configuration or may provide only a minimal activation force that is below the threshold of tooth movement force when the teeth are in their ideal position. The retainers may react immediately at the smallest indication of relapse, providing a strong load deflection characteristic, having a high load at small displacement when relapse begins occurring.

In general, the methods and apparatuses described herein are configured for retainers, but these techniques can be incorporated in a treatment plan for aligning a patient's teeth. This may allow the treatment plan to handle more complex movements or prevent known unwanted side effects from happening, such as tipping, intrusion, or rotation. In addition, the use of a stability estimate as described herein may, in particular, help with staging, timing and ordering of stages, and may guide reinforcement of one or more region(s) of an aligner in order to prevent relapse or other unwanted tooth movement during treatment, not limited to post-treatment.

Figure 12:
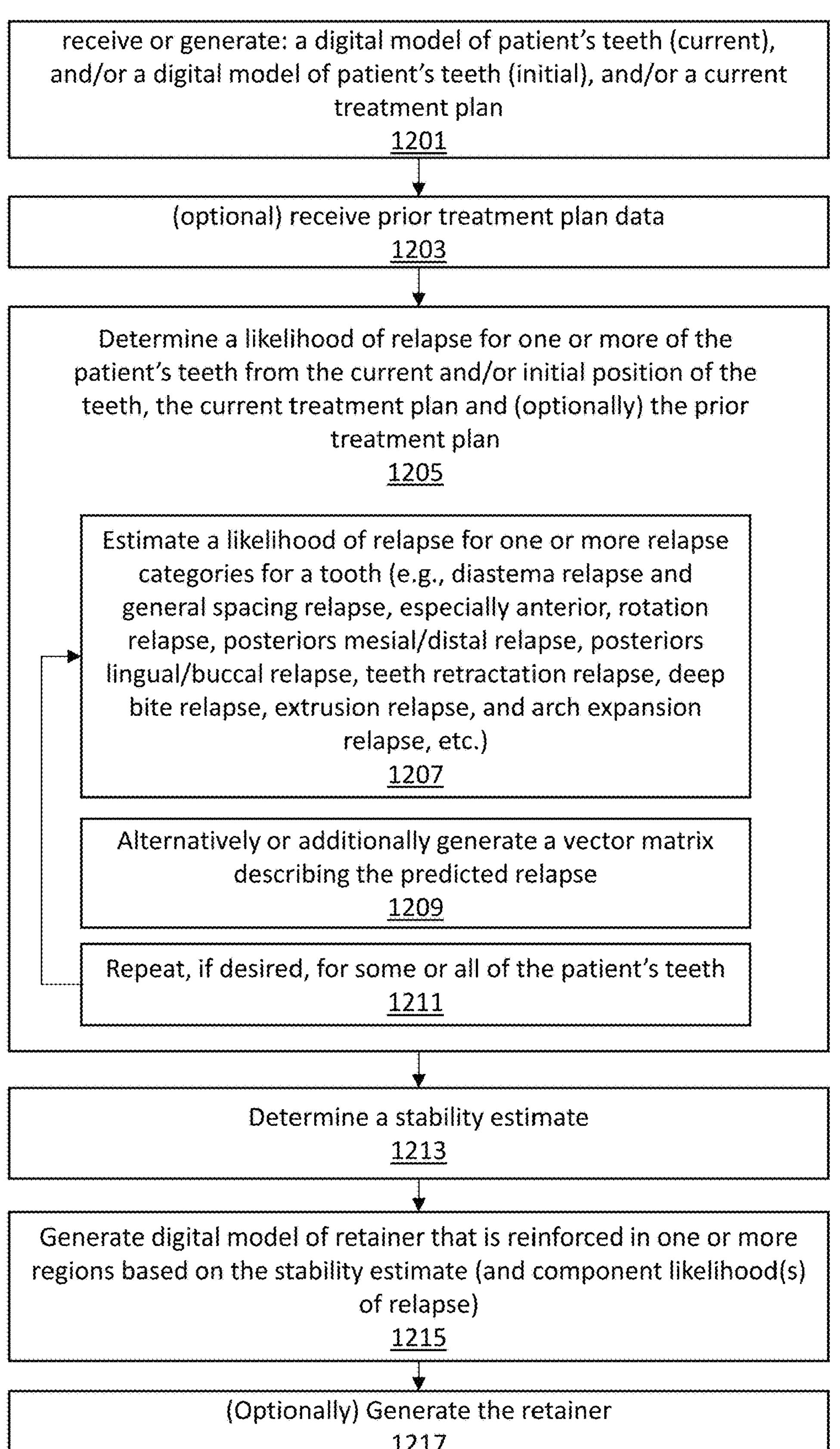
FIG. 12 is a chart illustrating one method of designing a custom retainer as described herein.

For example, FIG. 12 illustrates one example of a method of generating a digital model of a custom retainer as described herein. In this example, the method (or a system to perform the methods, including software), may initial retrieve and/or generate a digital model of the patient's teeth (e.g., current and/or initial and/or intermediate models), and/or the current treatment plan 1201. In some examples, the method or apparatus may retrieve a prior treatment plan (and/or outcome information, including tooth position 1203.

The method may then determine a likelihood of relapse for one or more of the patient's teeth from the current and/or initial position of the teeth, the current treatment plan and (optionally) a prior treatment plan 1205. In some examples, this may include estimating (for each tooth) a likelihood of relapse for one or more relapse categories for a tooth (e.g., diastema relapse and general spacing relapse, especially anterior, rotation relapse, posteriors mesial/distal relapse, posteriors lingual/buccal relapse, buccal crown tip out relapse, deep bite relapse, extrusion relapse, and arch expansion relapse, etc.) 1207. Alternatively or additionally this may include generating a vector matrix describing the predicated relapse 1209. These steps of estimating a likelihood of relapse may be repeated for some or all of the patient's teeth 1211. As used herein, the term retraction may refer to an orthodontic bodily movement, whereby the crown and root both translate in the same direction, after which tipping may occur, whereby only the crown swings but the root apex is static. In some examples described herein the term proclination may refer to buccal crown tip out, and retroclination may refer to lingual crown tip in.

The resulting likelihood of relapses may become or may be used to generate the stability estimate, including an overall estimate and/or individual (tooth and/or relapse category-specific) stability estimates.

The stability estimate(s), which may also be referred to as the likelihoods of relapse, may be used to generate a digital model of a retainer specific to the patient that is reinforced in one or more regions based on the stability estimate (and component likelihood(s) of relapse) 1215. Optionally, this digital model may be used to generate a retainer 1217.

In some examples, described herein are method and apparatuses for determining the likelihood of relapse for one or more of the patient's teeth (e.g., relevant portion of eh method shown in FIG. 12. These methods may therefore including determining a stability estimate. A method and/or apparatus for determining a stability estimate may be standalone, or it may be part of an apparatus or method, including, for example part of a treatment planning apparatus or method, part of method or service performed by a dental professional (e.g., dentist, orthodontist, etc.) as part of treatment planning or otherwise.

Also described herein are retainers formed by the methods described herein.

Any of the apparatuses and methods described herein may add up to 0.2 mm of overcorrection in the retainer to accommodate for physiological tooth movement or relapse. Adding 0.2 mm of overcorrection movement in the retainer may help generate a resistance type of force to accommodate for any physiological tooth movement that may occur or help counterbalance any effect of stress relaxation or loss of elasticity loss of the retainer material over time. Adding 0.2 mm of overcorrection in the retainer is also within the normal or physiological tooth mobility that occurs and therefore is not considered to be active tooth movement being added but rather movement to resistant the normal physiologic process. A total of 0.2 mm of overcorrection movement may be added to help keep pressure on the teeth to resist the physiological tooth movement or the tendency to relapse due to the biological process or due to the stress relaxation of the material. In some examples overcorrection may be added using the method (e.g., software) by overtightening contact points between teeth, e.g., by moving anterior teeth up to 0.2 mm lingually and posterior teeth up to 0.2 mm mesially.

In any of these methods and apparatuses, the retainer may be configured to apply a counter moment to force or movement of the teeth out/away from the target position. Alternatively or additionally, the apparatus or method may be configured to simply contact the specific tooth or teeth or which a significant deviation from the target position is predicted (e.g., based on the stability estimate as described herein). Thus, the method may include contacting or touching the nerve to maintain a light touch (e.g., below the level of force resulting in tooth movement within the time order of the retainer use (e.g., weeks, months, etc.). This physical communication (e.g., contact) may result in a small amount of pressure, e.g., as indicated above, less than 0.2 mm of displacement of the retainer surface against the tooth or teeth.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of creating a retainer for a patient, the method comprising:

estimating a stability estimate for one or more of the patient's teeth from a model of the patient's teeth and a current orthodontic treatment plan for the patient, wherein the stability estimate corresponds to a likelihood that the one or more of the patient's teeth will move out of a target final position from the current orthodontic treatment plan; and generating a model of the retainer, wherein the retainer is reinforced in one or more regions configured to be in communication with the one or more of the patient's teeth in which the stability estimate exceeds a threshold.

2. The method of claim 1, wherein the model of the retainer is a digital model.

3. The method of claim 1, where estimating comprises using one or more prior treatment plans specific to the patient in addition to the current orthodontic treatment plan for the patient to estimate a final post-treatment relapse position for the one or more of the patient's teeth.

4. The method of claim 1, further comprising forming the retainer from the model of the retainer.

5. The method of claim 1, wherein estimating the stability estimate comprises using a machine-learning algorithm trained on a plurality of treatment plans and tooth models.

6. The method of claim 1, wherein estimating comprises estimating a plurality of stability estimates, wherein each stability estimate corresponds to a different tooth of the patient's teeth.

7. The method of claim 1, further comprising, for each stability estimate that exceeds the threshold, determining a force vector corresponding to a movement of the one or more of the patient's teeth beyond the target final position.

8. The method of claim 7, wherein generating the model of the retainer comprises including reinforcement to counter the force vector.

9. The method of claim 1, wherein estimating the stability estimate for one or more of the patient's teeth comprises estimating the stability estimate for one or more of: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction, Class II treatment relapse, and Class III treatment relapse.

10. The method of claim 1, wherein generating the model of the retainer comprises including reinforcement of the one or more regions by making the retainer thicker, stiffer and/or having a longer trim line in the one or more regions configured to be in communication with the one or more of the patient's teeth.

11. The method of claim 1, wherein generating the model of the retainer comprises including reinforcement of the one or more regions by including a strut or the retainer thicker in the one or more regions configured to be in communication with the one or more of the patient's teeth.

12. The method of claim 1, wherein generating the model of the retainer comprises including reinforcement of the one or more regions so that the retainer applies a force on the one or more of the patient's teeth in which the stability estimate exceeds a threshold to overcorrect the one or more of the patient's teeth.

13. A computer-implemented method of custom designing a retainer for a patient, the method comprising:

estimating, in a processor, from a model of the patient's teeth, a current orthodontic treatment plan for the patient, a stability estimate for one or more of the patient's teeth, wherein the stability estimate corresponds to a likelihood that the one or more of the patient's teeth will move beyond a target final position from the current orthodontic treatment plan in one or more relapse categories including: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction; and generating a model of the retainer, wherein the retainer is modified in one or more regions configured to be in communication with the one or more of the patient's teeth in which the stability estimate exceeds a threshold.

14. A non-transitory computer-readable medium including contents that are configured to cause one or more processors to perform a method comprising:

estimating, from a model of the patient's teeth and a current orthodontic treatment plan for a patient, a stability estimate for one or more of the patient's teeth, wherein the stability estimate corresponds to a likelihood that the one or more of the patient's teeth will move out of a target final position from the current orthodontic treatment plan; and generating a model of a retainer, wherein the retainer is reinforced in one or more regions configured to be in communication with the one or more of the patient's teeth in which the stability estimate exceeds a threshold.

15. The non-transitory computer-readable medium of claim 14, where estimating comprises using one or more prior treatment plans specific to the patient in addition to the current orthodontic treatment plan for the patient to estimate a final post-treatment relapse position for the one or more of the patient's teeth.

16. The non-transitory computer-readable medium of claim 14, wherein the contents are further configured to cause the one or more processors to form the retainer from the model of the retainer.

17. The non-transitory computer-readable medium of claim 14, wherein estimating the stability estimate comprises using a machine-learning algorithm trained on a plurality of treatment plans and tooth models.

18. The non-transitory computer-readable medium of claim 14, wherein estimating comprises estimating a plurality of stability estimates, wherein each stability estimate corresponds to a different tooth of the patient's teeth.

19. The non-transitory computer-readable medium of claim 14, wherein the contents are further configured to cause the one or more processors to determine, for each stability estimate that exceeds the threshold, a force vector corresponding to a movement of the one or more of the patient's teeth beyond the target final position.

20. The non-transitory computer-readable medium of claim 19, wherein generating the model of the retainer comprises including reinforcement to counter the force vector.

21. The non-transitory computer-readable medium of claim 14, wherein estimating the stability estimate for one or more of the patient's teeth comprises estimating the stability estimate for one or more of: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction, Class II treatment relapse, and Class III treatment relapse.

22. The non-transitory computer-readable medium of claim 14, wherein generating the model of the retainer comprises including reinforcement of the one or more regions by making the retainer thicker, stiffer and/or having a longer trim line in the one or more regions configured to be in communication with the one or more of the patient's teeth.

23. The non-transitory computer-readable medium of claim 14, wherein generating the model of the retainer comprises including reinforcement of the one or more regions by including a strut or the retainer thicker in the one or more regions configured to be in communication with the one or more of the patient's teeth.

24. The non-transitory computer-readable medium of claim 14, wherein generating the model of the retainer comprises including reinforcement of the one or more regions so that the retainer applies a force on the one or more of the patient's teeth in which the stability estimate exceeds a threshold to overcorrect the one or more of the patient's teeth.

25. A non-transitory computer-readable medium including contents that are configured to cause one or more processors to perform a method comprising:

estimating, in a processor, from a model of the patient's teeth, a current orthodontic treatment plan for a patient, a stability estimate for one or more of the patient's teeth, wherein the stability estimate corresponds to a likelihood that the one or more of the patient's teeth will move beyond a target final position from the current orthodontic treatment plan in one or more relapse categories including: diastema relapse and general spacing relapse, anterior or posterior mesial/distal or buccal/lingual or rotational relapse, lingual crown tip in/buccal crown tip out, deep bite relapse, extrusion/intrusion relapse, arch expansion relapse and/or extraction; and generating a model of a retainer, wherein the retainer is modified in one or more regions configured to be in communication with the one or more of the patient's teeth in which the stability estimate exceeds a threshold.

* * * * *